June 14, 1927.

G. B. COLEMAN 1,632,696

TRANSMISSION

Filed June 3, 1926

Inventor
George B. Coleman

By

Attorney

June 14, 1927.

G. B. COLEMAN

TRANSMISSION

Filed June 3, 1926

Inventor
George B. Coleman

By

Attorney

Patented June 14, 1927.

1,632,696

UNITED STATES PATENT OFFICE.

GEORGE B. COLEMAN, OF PHILADELPHIA, PENNSYLVANIA, ASSIGNOR TO COLEMAN AUTOMATIC TRANSMISSION COMPANY, A CORPORATION OF CALIFORNIA.

TRANSMISSION.

Application filed June 3, 1926. Serial No. 113,539.

The object of the invention is to provide a transmission in which the torque and speed of the driven member are automatically varied to suit the load conditions of the latter without affecting the speed and, therefore, imposing an overload on the driving member; and to provide a construction of this character in which any speed below synchronism in the driven member is attended substantially continuously with the movement of a weight against centrifugal force.

With this object in view, the invention consists in a construction and combination of parts of which a preferred embodiment is illustrated in the accompanying drawings, wherein.

Figure 1:
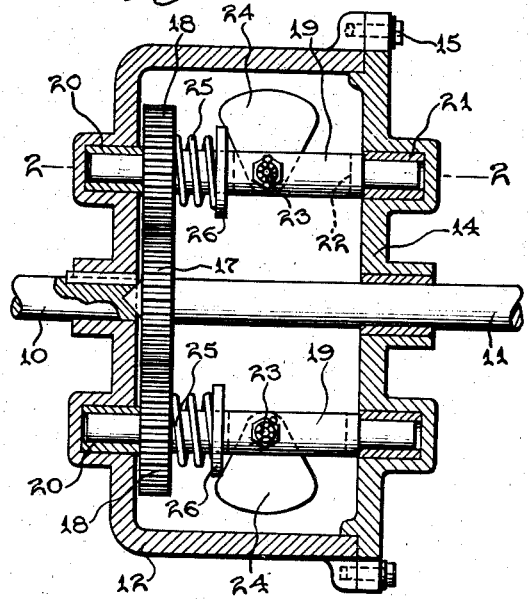
Figure 1 is a central vertical sectional view through one embodiment of the invention.
Figure 2:
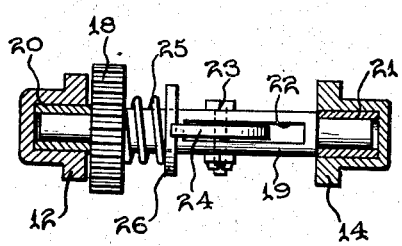
Figure 2 is a horizontal sectional view on the plane indicated by the line 2—2 of Figure 1.

The driving shaft 10 and driven shaft 11, in the form shown in Figure 1, are axially aligned, the latter having a bearing at its forward end in the rear end of the former on which is mounted a planet carrier 12 in the form of a cylindrical housing of which the end case 14 is detachably secured to it by means of cap screws 15. The driven shaft 11 extends axially through the housing 12, being journaled in a bearing in the end case 14.

At its forward extremity, the driven shaft 11 carries a gear 17, the latter meshing with the planetary gears 18 disposed on diametrically opposite sides of the driven shaft 11, if there be two of such gears (or uniformly spaced angularly in a circle around the driven shaft 11 if there be more than two). The planetary gears 18 are mounted on shafts 19 journaled at their extremities in bearings formed in the housing 12 and in the end case 14, as indicated at 20 and 21.

The shafts 19 are formed with slots 22 extending diametrically through them and the slots are spanned by diametrical stub shafts 23, these shafts supporting weights 24 of preferably triangular form, the weights being formed with eyes adjacent one apex for loose engagement with the stub shaft so that they may swing around the latter as a center. By this construction, the axis of movement of the weights is at right angles to the movement of the shafts 19 on their own axes and, if the housing 12 be rotated, centrifugal force tends to keep the weights 24 disposed outwardly, that is, adjacent the peripheral wall of the housing 12.

With the load tending to resist rotation of the driven shaft 11 and the driving shaft 10 rotating because of connection with a prime mover, such as an auto vehicle engine, the planet carrier or housing 12 is rotated and the shafts 19 and therefore the weights 24 are bodily rotated with the result that the driven shaft moves in synchronism with the driving shaft if the centrifugal force of the weights is sufficient to overcome the load. If not, the angular speed of the driven shaft falls below that of the driving shaft and the shafts 19 are rotated on their own axes, the weights 24 being thus swung inwardly until they occupy positions between the driven shaft and the shafts 19. In such positions, the weights may then swing instantly on the stub shafts 23 to their former outer positions, moving through the clearance spaces provided by the slots 22 in the shafts 19.

In order that there may be no tendency of the weights 24 to remain stationary with respect to the shafts 19 when they occupy their inner positions, means are provided for moving them off center in their inner positions and when centrifugal force is the least and such means comprises springs 25 disposed on the shafts 19 and compressed between the planetary gears 18 and collars 26 loosely mounted on the shafts. In the inner positions of the weights, the pressure of the collars on the latter swings them off center and they immediately fly outwardly to be again swung inwardly by a one hundred and eighty degree movement of the shafts 19. In the outward positions, the centrifugal force is sufficient to enable the weights to overcome the pressure of the springs 25 and thus maintain their center lines on radial lines.

The movement of the weights 24 inwardly by the rotation of the shafts on their own axes tends, because of the centrifugal force imparted to the weights by the rotation of the housing 12, to oppose rotation of the shafts 19 on their own axes and thus there is a tendency to accelerate the driven member and the angular speed of the shafts 19 will, therefore, drop off as the driven member accelerates until finally, when the latter moves in synchronism with the driving member and with the housing 12, the shafts 19 will cease to rotate on their own axes.

Figure 3:
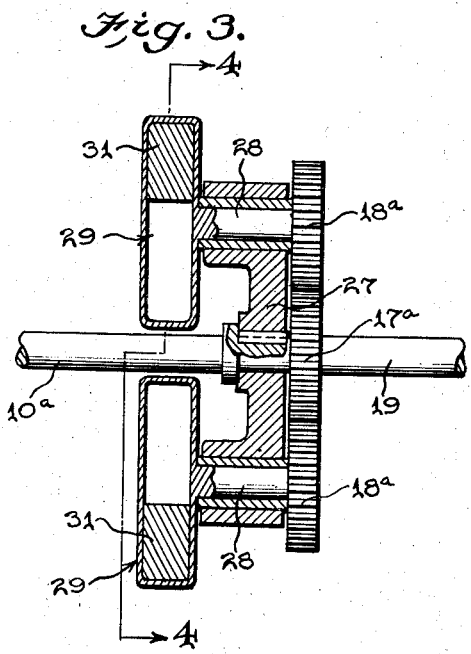
Figure 3 is a similar sectional view of another embodiment of the invention.
Figure 4:
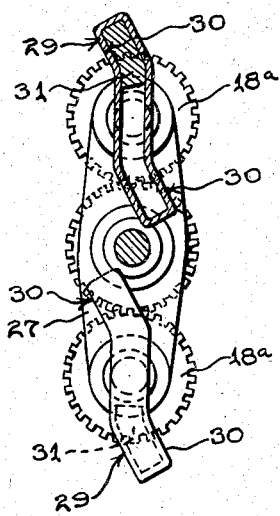
Figure 4 is a sectional view on the plane indicated by the line 4—4 of Figure 3.

In the modification shown in Figure 3, the principle involved is precisely the same as that of the structure shown in Figure 1. In this modification, however, the driver $10^a$ carries a spider 27 in the arms of which, adjacent the outer ends, are mounted the short shafts 28, the latter having connected with them the planetary gears $18^a$ meshing with the gears $17^a$ carried by the driven member $11^a$. The movement of the driver is transmitted to the driven through the spider 27 and the planetary gears $18^a$ and gears $17^a$ and whether or not it moves synchronously with the driver depends upon whether the planetary gears $18^a$ and the shafts 28 rotate on their own axes.

The means of interposing a resistance to such rotation in this form of the invention consists of closed tubular members 29 carried by the shafts 28 and disposed transversely of the latter, the extremities of the tubular members being deflected, as indicated at 30, the deflected portions being disposed in opposite directions at opposite ends of said tubular members. Fluid elements 31 are carried in the tubular members, being volumetrically dimensioned according to the deflected portions of said members. In the rotation of the spider, the fluid elements (which may be oil, mercury or any acceptable material) are carried to the outer ends of said tubular members by centrifugal force and thus tend to resist any rotation of the shafts 28 on their own axes. When the load on the driven member $11^a$ is sufficient, however, to cause such rotation of the shafts 28, the fluid elements are moved inwardly just as the weights 24 in the embodiment shown in Figure 1, and when they reached positions adjacent the shafts, they flow quickly through the tubular members to the opposite extremity which at that time is disposed outwardly, where they again begin their inward movement through the succeeding one hundred and eighty degree movement of the shafts 28. Thus, the outward movement of the fluid elements is practically instantaneous, whereas there is a time element involved in their inward movement, and the latter being always opposed by centrifugal force, rotation of the shafts 28 on their own axes is opposed and hence there is a tendency to accelerate the speed of the driven member until it attains a speed in synchronism with the driving member.

Figure 5:
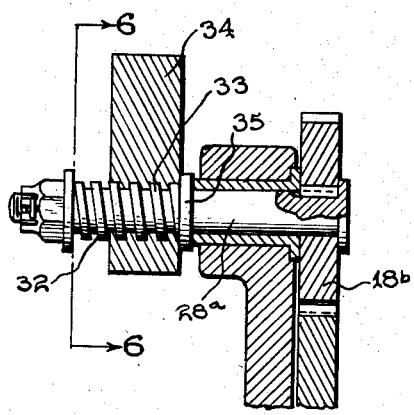
Figure 5 is a sectional view of still another embodiment of the invention.
Figure 6:
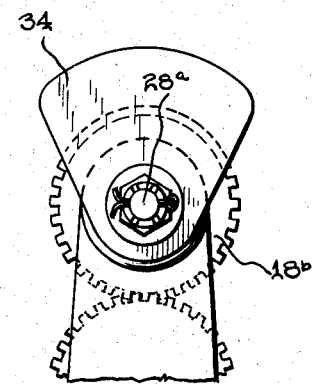
Figure 6 is a sectional view on the plane indicated by the line 6—6 of Figure 5.

In the modification shown in Figure 5, the structure shown in Figure 3 is adhered to with the exception that the shaft $28^a$ with which the planetary gears $18^b$ are connected are extended axially, as indicated at 32, and provided with coarse threads 33. On these threaded extension 32 are mounted weights 34 and the latter are brought into abutting engagement with shoulders 35 on the shafts $28^a$ upon the rotation of said shafts $28^a$ in one direction—that is, in the direction in which these shafts rotate in their operation in the organization of which they are a part. The engagement of the weights 34 with the shoulders 35 precludes relative movement of the weights and shafts as the weights are moved inwardly by the rotation of the shafts but when the weights shall have completed the one hundred and eighty degree movement inward and again begin the movement outward, they may swing outward instantaneously independent of the shafts, since they are then subject to action of centrifugal force and the coarse threads 33 free them from engagement with the shoulders 35, since they impart movement to the weights axially of the shafts. Having reached the outward positions, centrifugal force maintains the weights in such positions and the rotation of the shafts $28^a$ on their axes then, by virtue of the threads 33, move the weights axially of the shafts until they again abut the shoulders 35 and begin another inward movement. In this form, the inward movement of the weights tends to resist axial rotation of the shafts $28^a$ and, therefore, to accelerate the driven member up to a speed in synchronism with the driving member.

Figure 7:
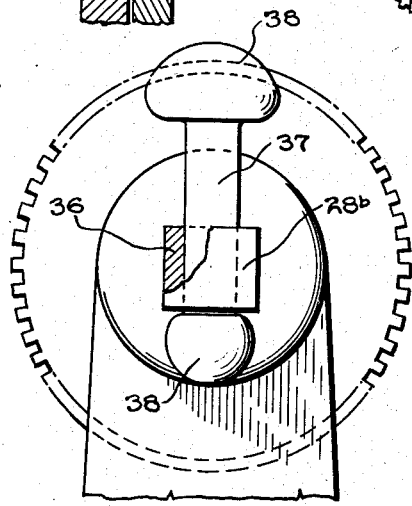
Figure 7 is an elevational view showing a modification of the form of weighted element employed in the construction shown in Figure 3.

In the modification shown in Figure 7, each planetary gear shaft $28^b$ at one extremity is bored diametrically, as indicated at 36, and the weighted element consists of a rod 37 enlarged at its extremities, as indicated at 38. In the bodily rotation of the shaft $28^b$, centrifugal force tends to keep the weighted element disposed radially and therefore one of the weighted extremities 38 abuts the shaft $28^b$ and the other weighted extremity 38 is disposed outwardly or away from the shaft $28^b$. Upon axial rotation of said shaft $28^b$, however, the outer weighted portion 38 is moved inwardly toward the axis of rotation of the driving and driven shafts and therefore opposes axial rotation of the shaft $28^b$. When the latter shall have completed one hundred and eighty degree movement on its own axis, the previous inwardly disposed weighted portion 38 flies outward and its place is taken by the previous outwardly disposed weighted portion 38. Thus, in this construction, the weighted element changes every one hundred and eighty degree of axial rotation of the shaft $28^b$, and the weight is therefore always moved against centrifugal force with the ever present tendency to resist axial rotation of the shaft $28^b$.

Figure 8:
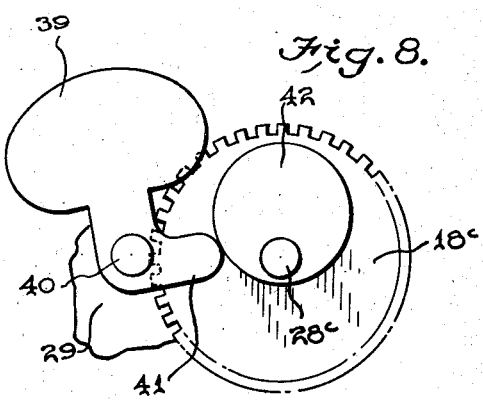
Figure 8 is an elevational view illustrating a modified form of control for the rotation of the planetary gears.

In the modification shown in Figure 8, resistance is interposed to the rotation of the planetary gear $18^c$ and to its shaft $28^c$ by means of an oscillatory weight 39 pivotally mounted, as at 40, on the carrier $12^a$, the weight 39 being carried by an angular arm of which the free extremity 41 engages the periphery of an eccentric 42 carried by the shaft $28^c$.

The invention having been described, what is claimed as new and useful is:

1. A transmission comprising driving and driven members and operative connections between the two comprising epicyclic gears, said gears having weights movable synchronously with them through substantially half an axial revolution and then movable independently of the gears and instantaneously to the diametrically opposite sides of the latter.

2. A transmission comprising driving and driven members and operative connections between the two comprising epicyclic gears, said gears having centrifugal elements movable synchronously with the gears when the elements are moving inwardly and independently of the gears when the elements are moving outwardly.

3. A transmission comprising driving and driven members and operative connections between the two comprising epicyclic gears, said gears having centrifugal elements instantaneously transferable to diametrically opposite sides of the gears to interpose a substantially continuous resistance to axial rotation of the gears.

4. A transmisison comprising driving and driven elements, a planet carrier positively connected with one of said elements and provided with planetary gears meshing with a gear carried by the other element, and weights having pivotal connections at the axes of said planetary gears and at right angles to said axes.

5. A transmission comprising driving and driven members, a planet carrier having positive connection with one of said members, planetary gears carried by said carrier and meshing with a gear connected to the other of said members, and weights operatively connected with said planetary gears and having pivotal mountings at right angles to the axes of said gears.

6. A transmission comprising driving and driven members, a planet carrier having positive connection with one of said members, planetary gears carried by said carrier and meshing with a gear connected to the other of said members, weights operatively connected with said planetary gears and having pivotal mountings at right angles to the axes of said gears, and means tending to deflect the weights on their pivotal mountings.

In testimony whereof he affixes his signature.

GEORGE B. COLEMAN.